United States Patent
Hughett et al.

[19]

[11] Patent Number: 5,914,201
[45] Date of Patent: Jun. 22, 1999

[54] FILLING FIXTURE FOR ELECTRIC VEHICLE CELL

[76] Inventors: Elmer Hughett, Rte. 1, Box 151EC, Huntsville, Tenn. 37756; Richard B. Alexandres, 5193 Lakeview Dr., Clear Lake, Iowa 50428

[21] Appl. No.: 08/943,999

[22] Filed: Oct. 3, 1997

Related U.S. Application Data

[60] Continuation of application No. 08/725,384, Oct. 3, 1996, abandoned, which is a division of application No. 08/615,939, Mar. 14, 1996, Pat. No. 5,738,690, which is a continuation of application No. 08/484,077, Jun. 7, 1995, abandoned, which is a continuation-in-part of application No. 08/271,415, Jul. 6, 1994, Pat. No. 5,521,021.

[51] Int. Cl.$^6$ ...................................................... H01M 2/36
[52] U.S. Cl. ................................ 429/72; 429/64; 137/260
[58] Field of Search ................................ 429/72, 64, 76, 429/80; 137/260; 141/311

[56] References Cited

U.S. PATENT DOCUMENTS

| | | |
|---|---|---|
| 1,198,619 | 9/1916 | Clymer . |
| 2,382,675 | 8/1945 | Sutherland et al. . |
| 2,424,807 | 7/1947 | Eckman . |
| 2,452,049 | 10/1948 | Hauck . |
| 2,488,573 | 11/1949 | Wood . |
| 2,578,024 | 12/1951 | Steinmayer et al. . |
| 2,810,776 | 10/1957 | Brill et al. . |
| 3,748,186 | 7/1973 | Rosansky et al. . |
| 3,912,541 | 10/1975 | Britz et al. . |
| 4,006,281 | 2/1977 | Markin et al. . |
| 4,061,163 | 12/1977 | Decker et al. . |
| 4,091,181 | 5/1978 | Merritt, Jr. . |
| 4,136,438 | 1/1979 | Mallory . |
| 4,289,176 | 9/1981 | Evans . |
| 4,350,185 | 9/1982 | Quist . |
| 4,386,141 | 5/1983 | Weidner et al. ........................... 429/64 |
| 4,476,202 | 10/1984 | Wesner . |
| 4,529,020 | 7/1985 | Hoover et al. . |
| 4,695,519 | 9/1987 | Rao et al. . |
| 4,749,633 | 6/1988 | Elias ......................................... 429/64 |
| 4,751,156 | 6/1988 | Olimpio .................................... 429/64 |
| 5,079,108 | 1/1992 | Annen et al. . |
| 5,090,442 | 2/1992 | Campau .............................. 137/260 X |
| 5,171,647 | 12/1992 | Dean et al. . |
| 5,201,924 | 4/1993 | Mix et al. . |
| 5,212,867 | 5/1993 | Vogel . |
| 5,309,937 | 5/1994 | Rover ................................... 429/76 X |
| 5,521,021 | 5/1996 | Alexandres et al. ...................... 429/54 |
| 5,731,099 | 3/1998 | Badger et al. ............................. 429/72 |

FOREIGN PATENT DOCUMENTS

| | | |
|---|---|---|
| 256568 | 1/1987 | Germany . |
| 56-24 765 | 3/1981 | Japan . |
| 60-59 654 | 4/1985 | Japan . |
| 60-246557 | 12/1985 | Japan . |
| 1193959 | 10/1967 | United Kingdom . |

*Primary Examiner*—Anthony Skapars
*Attorney, Agent, or Firm*—Kenyon & Kenyon

[57] ABSTRACT

An electric vehicle cell featuring internal pressure relief and spring disengagement devices which vent various internal pressures to atmosphere to prevent cell bulging or explosion and which also internally interrupt current flow through the cell due to internal overheat, excessive current draw and the like. Internal reconnection of cell members reoccurs subsequent to internal thermal and other abnormalities. The electric vehicle cell contains an electrolyte which is introduced into the cell casing by a method involving the use of apparatus including a filling fixture having an electrolyte fill line and a vacuum line for vacuum assisted filling.

8 Claims, 6 Drawing Sheets

FILLING FIXTURE FOR ELECTRIC VEHICLE CELL

CROSS REFERENCES TO CO-PENDING APPLICATIONS

This application is a continuation of Ser. No. 08/725,384, filed on Oct. 3, 1996, now abandoned, which is a divisional of application Ser. No. 08/615,939 filed Mar. 14, 1996, now U.S. Pat. No. 5,738,690 which is a continuation of application Ser. No. 08/484,077, filed Jun. 7, 1995, now abandoned, which was a continuation-in-part of U.S. Ser. No. 08/271,415, filed Jul. 6, 1994, now U.S. Pat. No. 5,521,021.

BACKGROUND OF THE INVENTION

1. Field of the Invention

The present invention pertains to an electric vehicle cell, and more particularly, relates to a cell for use in an electric vehicle having internal safeguards such as automatic internal cell disengagement and re-engagement and internal cell pressure relief. The invention also pertains to an apparatus and method for vacuum assisted filling of the electric vehicle cell with an electrolyte.

2. Description of the Prior Art

The prior art cell devices have included tabs from the electrodes leading to and welded to the positive and negative end plates. When a cell would experience dramatic operating conditions such as overheating, over current and other abnormal operating conditions, the internal connections would often be displaced to the point of rendering the battery inoperative during these abnormal excursions due to internal member breakage and the inability to accommodate internal movement of components. Clearly what is needed is a cell which is forgiving of the design flaws of prior art cells and which can accommodate such internal movement and fluctuations without rendering the cell totally useless.

The present invention provides such a cell having internal pressure relief and automatic cell disabling and re-enabling capabilities, which is filled under vacuum assistance.

SUMMARY OF THE INVENTION

The general purpose of the present invention is an electric vehicle cell. The cell can also be used for any other application, such as communications equipment.

According to one aspect of the present invention, there is provided an electric vehicle cell assembly having a central electrode aligned within a case member including members which align to the top and to the bottom regions of the central electrode and within or adjoining the battery case. Aligned above the electrode assembly are a positive current collector, a spring, a positive end plate, a gasket/seal ring, a vent pellet, a positive contact member and an upper closing ring. Aligned below the electrode assembly are a negative current collector, a negative current end plate, a gasket/seal ring, a negative contact and a closing ring. The spring member in the upper portion of the cell exerts pressure downwardly upon the positive current collector to engage the positive electrodes of the cell. Expansion of internal members of the cell overcomes spring tension to cause disengagement of the positive current collector with the positive electrodes. Contraction of the internal members allows re-engagement by spring force. Pressure relief is provided for by a vent valve located in the upper region of the cell. The positive and negative contact members are of compatible male/female configuration to allow stacking of cells.

Another aspect of the invention involves a method and apparatus for vacuum assisted electrolyte filling of the electric vehicle cell. Vacuum assisted filling provides for evacuation and reduction of air or gas pockets within the electrode assembly followed by low pressure assisted electrolyte placement into the cell casing.

One significant aspect and feature of the present invention is an internally relieved cell and can include an optimal pressure relief vent.

Another significant aspect and feature of the present invention is an internal current interrupter which disengages the positive electrode from a positive current collector during an event and re-engages subsequent to the event. The event can be excessive current flow.

Yet another significant aspect and feature of the present invention is a spring member forcing engagement or re-engagement of the positive electrode to a positive current collector. The positive and a negative current collector have V-projections for electrode contact. The positive current collector can move vertically within the battery case.

A further significant aspect and feature of the present invention is a cell having terminals which allow for building cell stacks.

Another significant aspect and feature of the present invention is a method and apparatus for vacuum filling of electrolyte into a battery cell.

Another significant aspect and feature of the present invention is the application of a vacuum to a cell casing and resident electrode assembly to remove pockets of air or gases from the electrode assembly.

Another significant aspect and feature of the present invention is a positionable can seal body which, when vacuum is applied, moves to seal against a spherical seal.

Another significant aspect and feature of the present invention is low pressure (vacuum) assistance for filling of a cell casing with electrolyte.

Having thus described aspect and f of the present invention, it is the principal object of the present invention to provide an electric vehicle cell with internal safeguard structures and to provide a method and apparatus for vacuum filling of electrolyte into the electric vehicle cell.

BRIEF DESCRIPTION OF THE DRAWINGS

Other objects of the present invention and many of the attendant advantages of the present invention will be readily appreciated as the same becomes better understood by reference to the following detailed description when considered in connection with the accompanying drawings, in which like reference numerals designate like parts throughout the figures thereof and wherein.

DETAILED DESCRIPTION OF THE PREFERRED EMBODIMENTS

Figure 1:
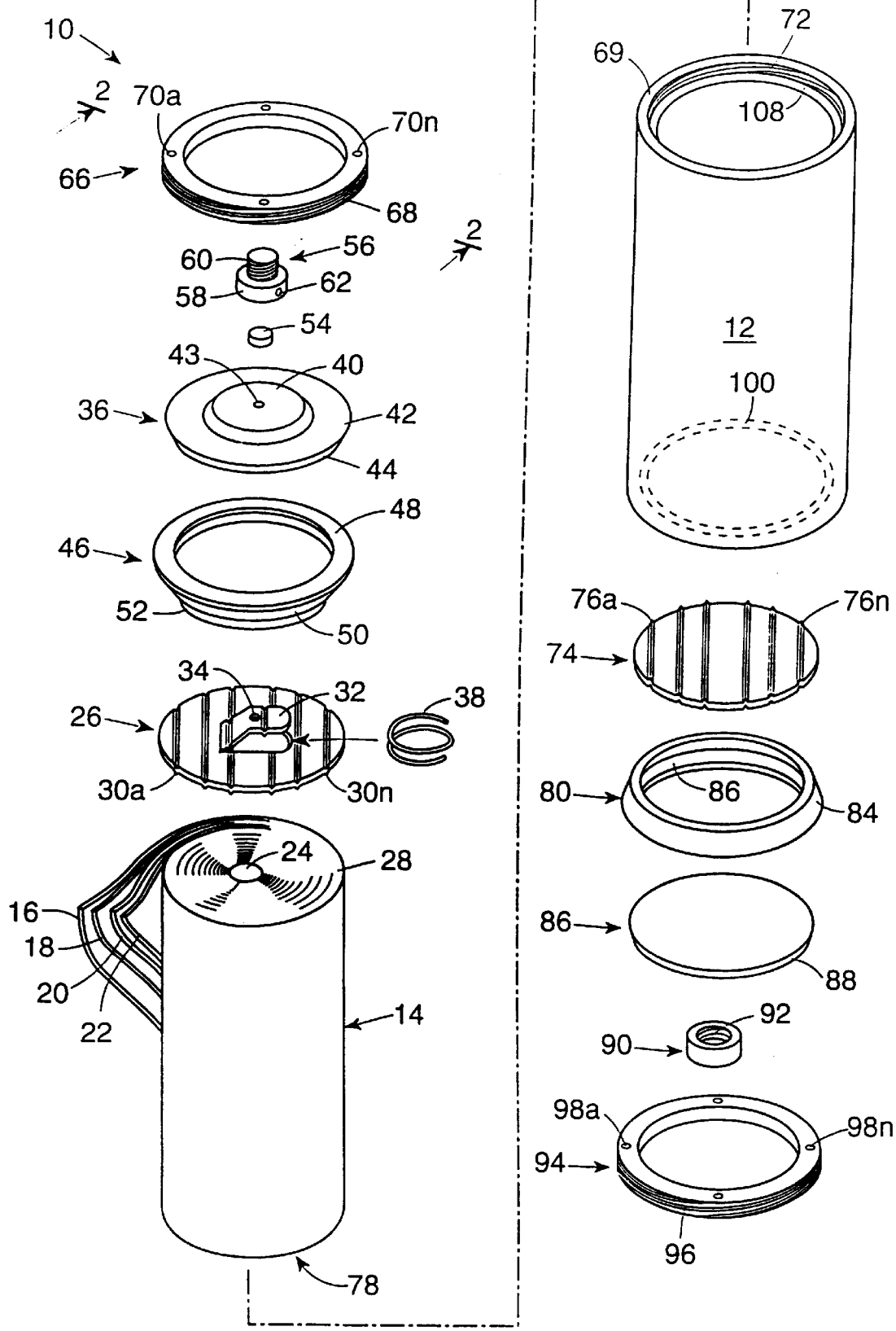
FIG. 1 is an exploded view of the electric vehicle cell.
Figure 2:
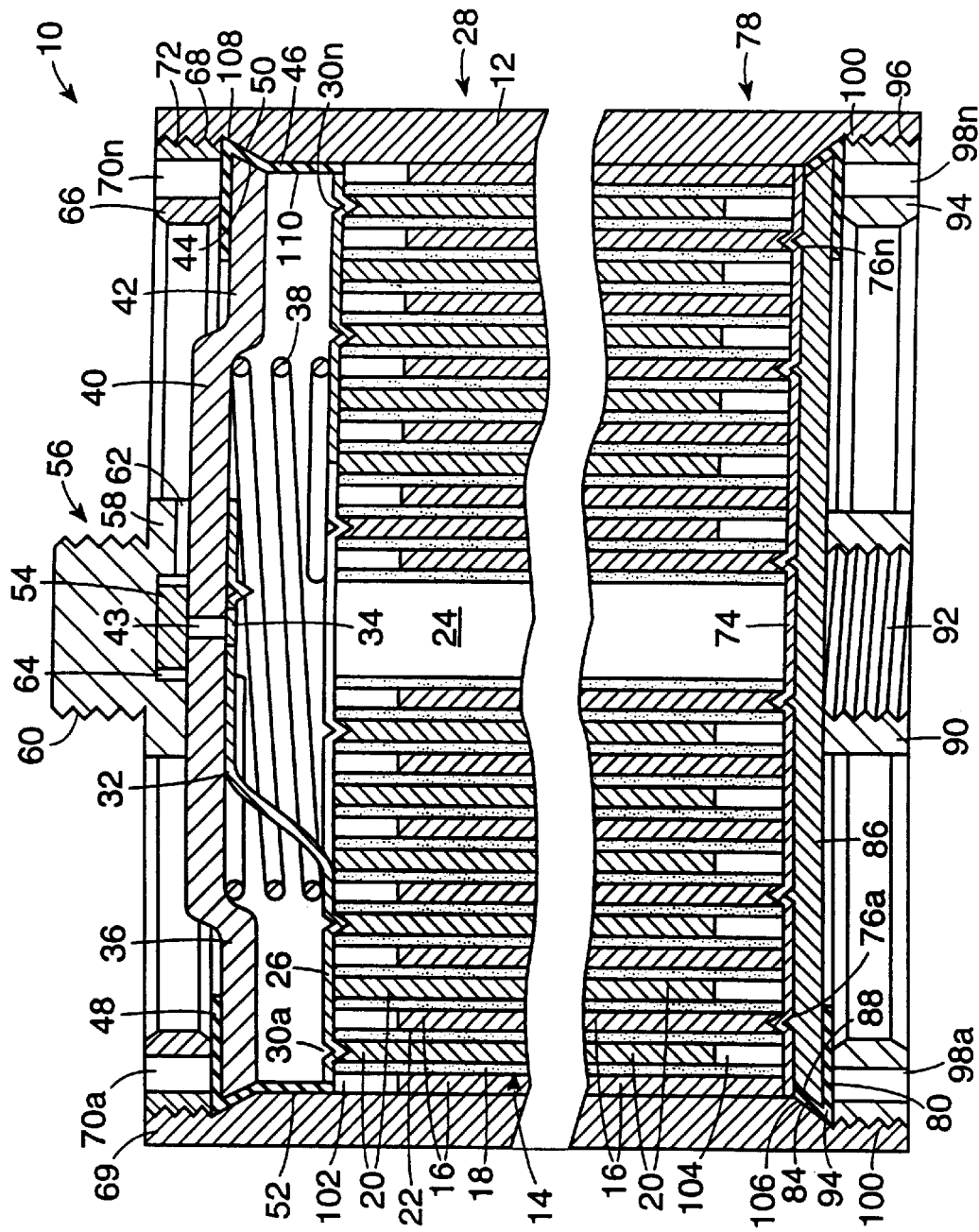
FIG. 2 is a foreshortened cross-sectional view of the cell along line 2—2 of FIG. 1; and, FIG. 3 is a view similar to FIG. 2 but showing the positive current collector disengaged from the positive electrode.

FIG. 1 is an exploded view of an electric vehicle cell 10 featuring a plurality of component members which align in a casing member 12. Aligned centrally in the casing member 12 is a spirally wound electrode assembly 14 having a negative electrode 16, a first separator 18, a positive electrode 20 and a second separator 22 arranged as a layer and continuously layered over and about itself in spiral fashion in an ever increasing radius about a mandrel hole 24. A circular and substantially planar positive current collector 26 aligns in intimate contact to the upper surface 28 of the electrode assembly 14 to physically and electrically contact the positive electrode 20 at a plurality of contact areas as illustrated in FIG. 2. A plurality of downwardly extending V-projections 30a–30n contact the wound positive electrode 20 along and about the top edge of the upper surface 28. A spring tab 32 extends upwardly at an angle and then extends horizontally parallel to the plane of the positive current collector 26. An orifice 34 is also included in the horizontal portion of the spring tab 32. The spring tab 32 meets and secures to the bottom side of a positive end plate 36 as illustrated in FIG. 2. A spring 38 aligns over and about the spring tab 32 to effect intimate physical contact with the upper surface of the positive current collector 26 at the lower portion of the spring 38. The upper portion of the spring 38 intimately contacts and aligns in and is captured in a flat dome 40 of the positive end plate 36. Spring 38 forces the positive current collector 26 into physical and electrical contact with the positive electrode 20 in the spirally wound electrode assembly 14. The circular positive end plate 36 includes planar portion 42, a flat dome 40 extending upwardly from the planar portion 42, a vent 43 central to the flat dome, and a beveled edge 44. A gasket/seal ring 46 includes a washer-like top member 48, and a beveled side member 50 being a truncated cone. A cylindrical member 52 extends downwardly from the beveled member 50. The gasket/seal ring 46 aligns over and about the planar surface portion 42 and the beveled edge 44 of the positive end plate 36 and around and about the circumference of the positive current collector 26 as illustrated in FIG. 2. A vent pellet 54 aligns over and about the vent 43 at the flat dome 40. A threaded positive contact member 56 having a round disk base 58, threads 60 extendingupwardly from the disk base 58, a vent hole 62 extending horizontally through the disk base 58 and a lower circular cavity 64, as illustrated in FIG. 2 aligns over and about the vent pellet 54 and bears against the flat dome 40 to form a relief valve in addition to being a positive connection point. An upper closing ring 66 having external circumferential threads 68 and a plurality of through holes 70a–70n aligns over and above the components illustrated therebelow to secure in threads 72 in the upper portion of the case 12 and to maintain the components in the interior of the casing 12. An annular surface 69 is located at the top of the casing 12.

A number of the components secure into the lower portion of the case 12 to effect a negative contact portion of the battery, including a negative current collector 74 having a plurality of upwardly extending V-projections 76a–76n for contact with the wound negative electrode 16 along and about the bottom edge of the electrode assembly lower surface 78, a negative current end plate 86 having a beveled edge 88, a gasket/seal ring 80 having a bevel member 84 and a lower flat washer-like member 85, a cylindrical negative contact 90 having internal threads 92 secured to the underside of the negative current end plate 86 and a closing ring 94 similar to closing ring 66 having external circumferential threads 96 and a plurality of vertically extending through holes 98a–98n. The external circumferential threads 96 of the closing ring 94 engage internal threads 100 of the casing 12, as illustrated also in FIG. 2. The gasket/seal ring 80 aligns over and about the negative current end plate 86 and to the lower surface of the negative current collector 74 to effect a lower end seal.

The electric vehicle cell or battery cell can be nickel cadmium, nickel metal hydride, lithium ion, lithium polymer, or silver metal hydride with the appropriate electrolyte such as potassium hydroxide. Representative uses for the cell can include a vehicle battery in series, parallel or series-parallel.

FIG. 2 is a foreshortened cross-sectional view of the cell 10 along line 2—2 of FIG. 1 where all numerals correspond to those elements previously described. Illustrated in particular is the overall connection between the pluralities of positive and negative electrodes 20 and 16 to the associated positive and negative members of the cell 10. It is noted that the lengths of the positive and negative electrodes 20 and 16 are not of the same length as the interspersed first and second separators 18 and 22 and that a space 102 of ever changing radius is provided over and above the top portion of the negative electrode 16. The positive electrode 20 extends upwardly beyond the height of the adjacent continues space 102 and between the upper regions of the first and second separators 18 and 22 where mutual physical and electrical contact with the V-projections 30a–30n of the positive current collector 26 is established. Contact of the V-projections 30a–30n of the positive current collector 26 with the negative electrode 16 is prevented in this region by the space 102 at the upper surface 28 of the electrode assembly 14. Spring tab 32 of the positive current collector 26 extents upwardly to align to and physically secure to and electrically connect to the underside of the flat dome 40 of the positive end plate 36. Spring 38 aligns over and about the tab 32 and between the underside of the flat dome 40 surface and the upper surface of the positive current collector 26 to exert downward pressure upon the positive current collector 26 to ensure contact of the V-projections 30a–30n with the positive electrode 20. Electrical flow proceeds through the positive current collector 26, the spring tab 32, positive end plate 36 and the positive connector member 56. Any excess pressure internal to the battery 10 is relieved and vented to atmosphere escaping through orifice 34 in the spring tab 32, vent 43, vent pellet 54, and vent hole 62 in the disk base 58. Other safety measures are described and illustrated in FIG. 3.

Connection to the negative electrode 16 is accomplished in the lower region of the cell 10. A space 104 is provided over and below the bottom position of the positive electrode 20 much in the same position as for space 102 at the upper portion of the battery 10. The negative electrode 16 extends downwardly beyond the uppermost region of the adjacent continual space 104 and between the lower regions of the first and second separators 18 and 22 where mutual physical and electrical contact with the V-projections 76a–76n of the negative current collector 74 is established. Contact of the V-projections 76a–76n of the positive current electrode 20 is prevented in this region by the continual space 104 at the lower surface 78 of the electrode assembly 14. The negative current collector 74 is in intimate physical contact and electrical contact with the negative current end plate 86. The cylindrical negative contact 90 secures to and is in direct physical and electrical contact with the negative current end plate 86. The lower end of the cell 10 is sealed by the compression of the gasket/seal ring 80 whereby the closing ring 94 is rotatingly advanced inwardly to cause the beveled edge 88 of the negative current end plate 86 to compress the bevel member 84 of the gasket/seal ring 80 between the bevel edge member 88 and a case bevel edge 106 adjacent to the screwthreads 100 in the casing 12. The upper end of the cell 10 is sealed in a somewhat similar fashion, the upper closing ring 66 is rotatingly advanced inwardly to cause the beveled edge 44 of the positive current end plate 36 to compress the bevel member 50 of the gasket/seal ring 46 between the bevel edge member 44 and a case bevel edge 108 adjacent to the screwthreads 72 in the casing 12. The circumference of the positive current collector 26 aligns within the radius 110 of the cylindrical member 52 of the gasket/seal ring 46 to accommodate vertical movement of the positive current collector 26 within the cylindrical member 52 of the gasket/seal ring 46 should such movement be caused by internal battery phenomenons such as thermal runaway, overcurrent, overload and other such interior anomalies.

Mode of Operation

Figure 3:
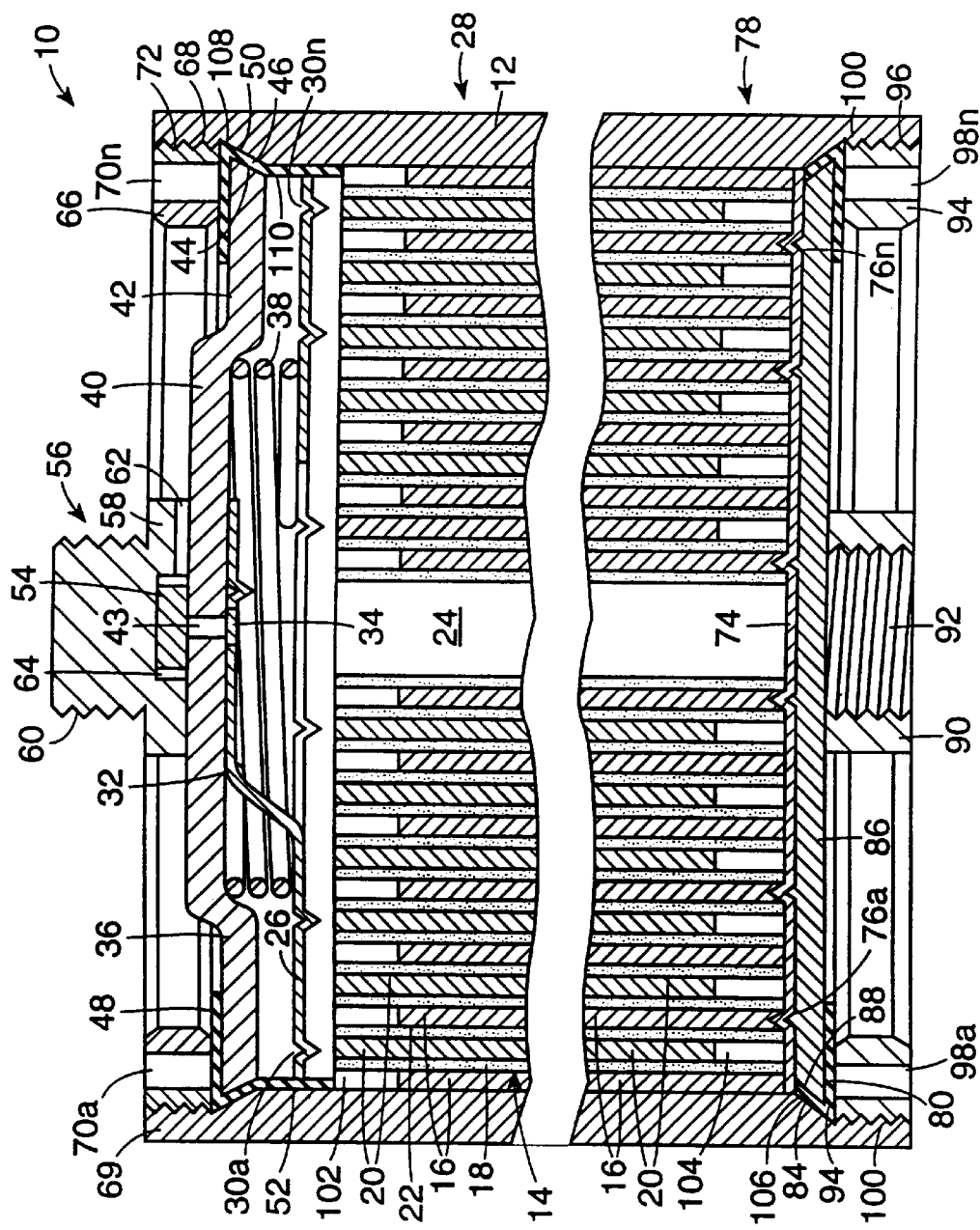

FIG. 3 illustrates the cell 10 of FIG. 2 where the positive current collector 26 has disengaged from the positive electrode 20 where all numerals correspond to those elements previously described. Internal pressures have caused the positive current collector 26 to move upwardly to physically and electrically disengage the positive electrode 20 from the positive current collector 26, thus interrupting current flow through the battery and acting as a circuit breaker or interrupter. Subsequent to battery cool-down or other undesirable occurrences and after reduction of internal pressures, the spring 38 repositions the positive current collector 26 for re-engagement with the positive electrode 20 so that battery operation may once again continue operation.

Figure 4:
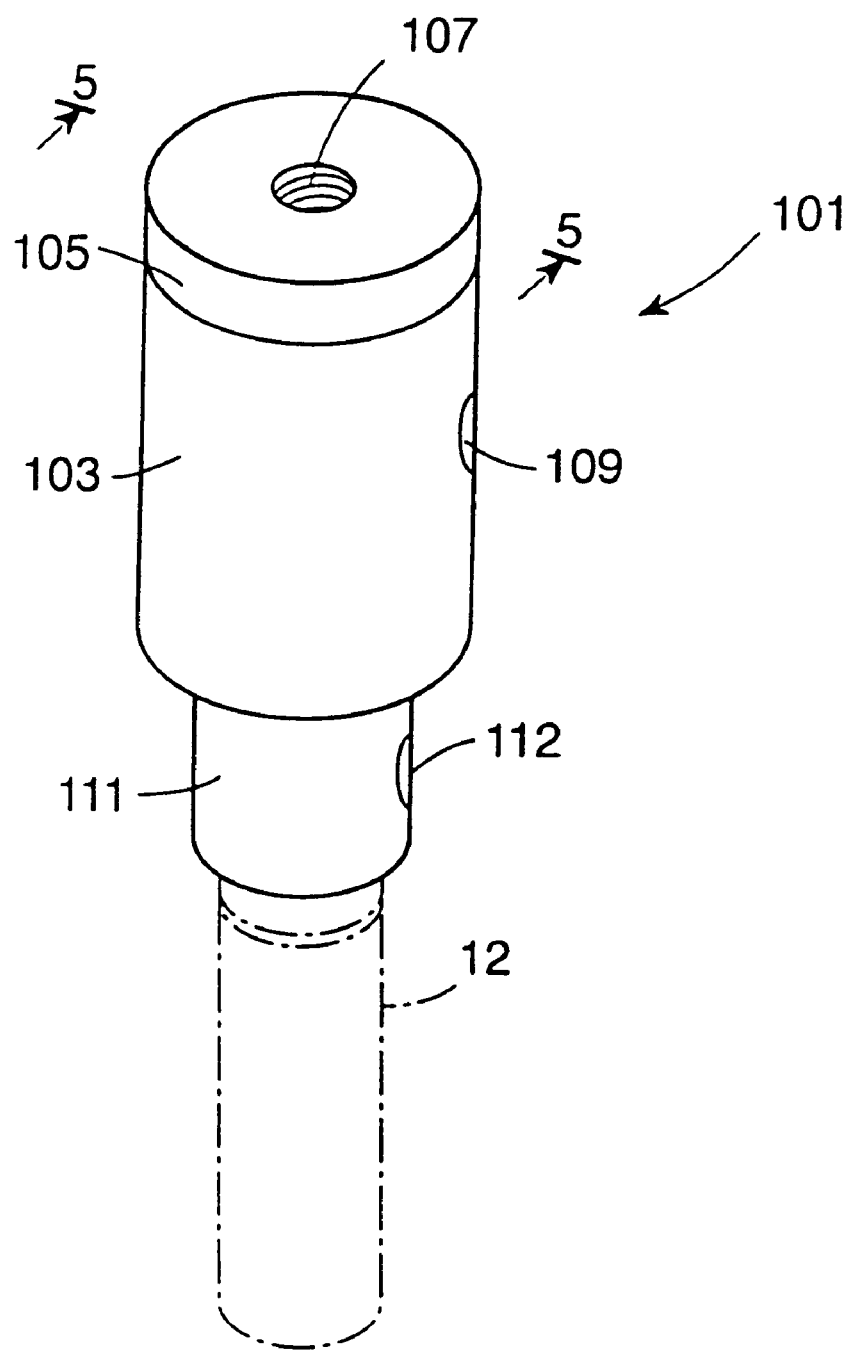
FIG. 4 is an isometric view of a filling fixture in conjunction with an electric cell.

FIG. 4 is an isometric view of a filling fixture 101 which comprises one component for filling of a battery casing 12 of the present invention under a vacuum for creation of a battery whose internal members are subjected to vacuum evacuation, where all numerals correspond to those elements previously described. Externally exhibited components of the filling fixture 101 include a cylindrical vacuum housing 103, a cylindrical vacuum housing cap 105, a threaded mounting hole 107 central to the vacuum housing cap 105, a vacuum passageway 109 aligned through the cylindrical vacuum housing 103, a spring loaded positionable cylindrically shaped can seal body 111 aligned through the central bottom area of the cylindrical vacuum housing 103, and an electrolyte passageway 112 aligned through the can seal body 111. Battery casing 12, is illustrated in engagement with the lower regions of the can seal body 111.

Figure 5:
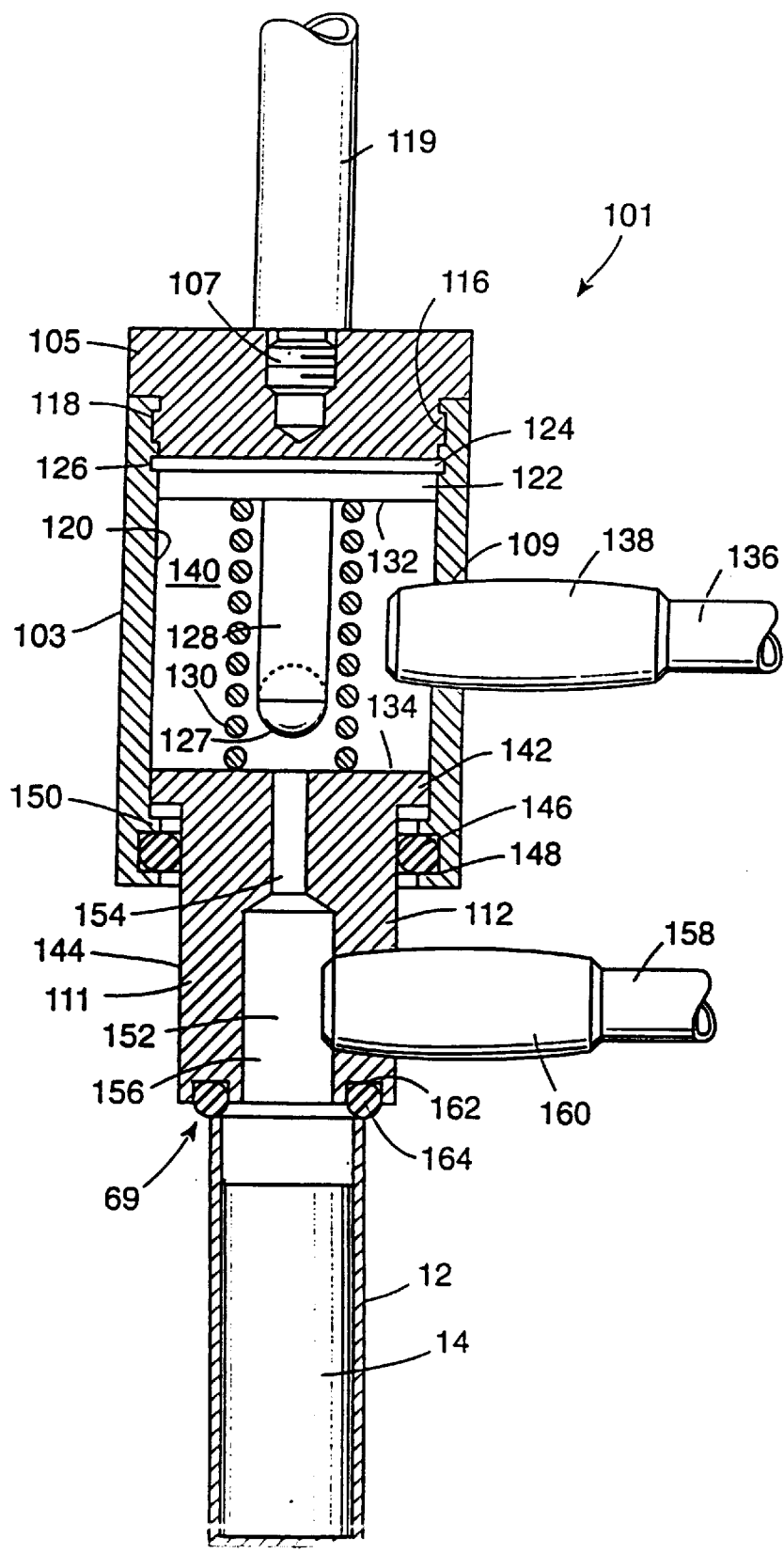
FIG. 5 is a cross sectional view along line 5—5 of FIG. 4.

FIG. 5 is a cross sectional view along line 5—5 so FIG. 4 where all numerals correspond to those elements previously described. Vacuum housing cap 105 includes an annular ring 116 in frictional sealing engagement with an annular groove 118 located on the inner cylindrical surface 120 of the vacuum housing 103. A mounting fixture rod 119 secures in the threaded hole 107 in the vacuum housing cap 105. A valve stem mounting disk 122 includes an annular ring 124 engaging an annular groove 126 located on the inner cylindrical surface 120. A vertically aligned valve stem 128, including a spherical seal 127 secured at its lower end, extends downwardly from the mounting disk 122. A spring 130 aligns over and about the valve stem 128 in alignment between the lower planar surface 132 of the mounting disk 122 and the upper planar surface 134 of the can seal body 111 to position the can seal body 111 in the extended position in the absence of vacuum, as illustrated. A vacuum line 136 and nipple 138 are ported to the vacuum housing interior 140 through vacuum passageway 109, the can seal body 111 includes an annular major radius surface 142, which slidingly aligns to the inner cylindrical surface 120 of the vacuum housing 103, and a minor radius surface 144. An O-ring 146 is located in an annular groove 148, the body of which extends inwardly to form a stop 150 in the lower region of the cylindrical vacuum housing 103. O-ring 146 seals against the minor radius surface 144 of the can seal body 111. A multi-radius continuous passageway 152, including an upper passageway 154 and a lower passageway 156, extends vertically through the can seal body 111. The upper passageway 154 seals against the spherical seal 127 when vacuum is applied through the vacuum line 136 to upwardly position the can seal body 111 as described later in detail. An electrolyte fill line 158 and nipple 160 are ported to the lower passageway 156 through the electrolyte passageway 112. An annular groove 162 at the lower region of the can seal body 111 accommodates an O-ring 164. The O-ring 164 positions against the upper annular surface 69 of the battery casing 12 in a manner which seals the interior of the battery casing 12 containing the electrode assembly 14 to the multi-radius passageway 152 and associated members. As vacuum is increased through vacuum line 136, the can seal body 111 overcomes the pressure of spring 130 and is advanced upwardly into the interior 140 of the cylindrical vacuum housing 103. The vacuum is applied to the cylindrical vacuum housing interior 140, the upper and lower passageways 154 and 156 of the multi-radius passageway 152. The electrolyte passageway 112 and to the interior of the battery casing 12 containing electrode assembly 14. Application of vacuum draws out any air or gases entrapped in the windings of electrode assembly 14. Continued vacuum application draws the can seal body 111 upwardly until the upper passageway 154 seals against the spherical seal 127, as illustrated in FIG. 6.

Figure 6:
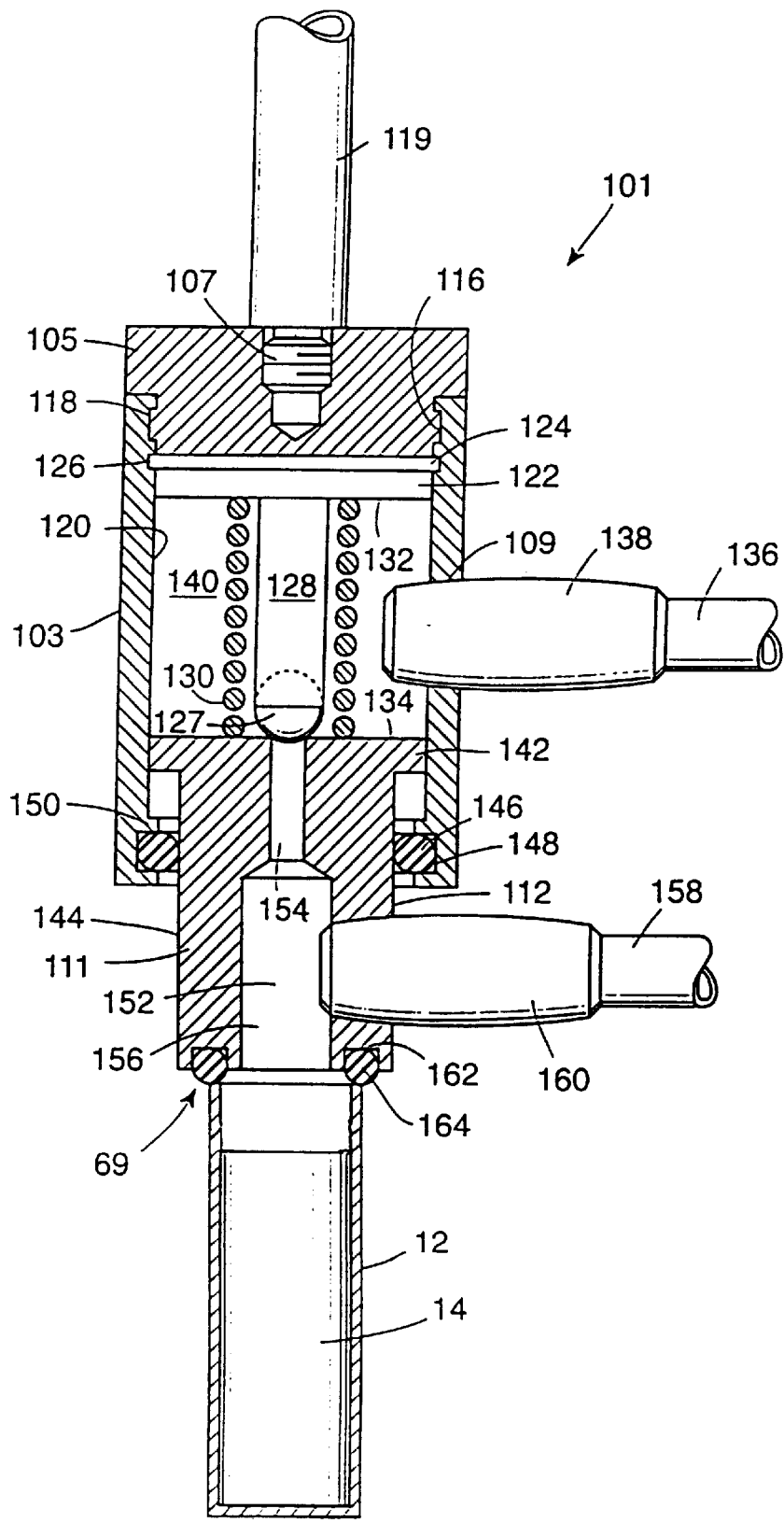
FIG. 6 is a view of filling fixture and electric cell of FIG. 5 having vacuum applied to the interior of the vacuum housing.

FIG. 6 illustrates the filling fixture 101 of FIG. 5 having vacuum applied to the interior 140 of the cylindrical vacuum housing 103 where all numerals correspond to those elements previously described. As previously described, vacuum is applied to the interior 140 of the cylindrical vacuum housing 103 to cause sealing between the spherical seal 127 and the upper passageway 154. Thus, while sealed, vacuum in the interior area 140 is subject to the vacuum level applied through the vacuum line 136. The vacuum level in the multi-radius passageway 152 and in the interior of the battery casing 12 is held at the level at which the seal between the spherical seal 127 and the upper passageway 154 was effected. Electrolyte is introduced into the multi-radius passageway 152 via the electrolyte fill line 158 and vacuum assisted into the lower pressure area of the multi-radius passageway 152 and into the interior of the battery casing 12 by the existing lower pressure. To summarize, vacuum assists in removal of air pockets from the electrode assembly 14 and aids and assists in vacuum placement of electrolyte into the battery casing 12. Subsequent to electrolyte placement in the battery casing 12, vacuum is released through vacuum line 136 whereby spring 130 assists in returning of the can seal body 111 to the position illustrated in FIG. 5 and the filled battery casing 12 is sealed as previously described.

Various modifications can be made to the present invention without departing from the apparent scope hereof.

We claim:

1. A filling fixture for vacuum assisted filling of a battery cell, having a cell casing and an internal electrode assembly, with an electrolyte, comprising:

a. a vacuum housing having a hollow interior defined by a peripheral wall having an outer surface and an inner surface, said vacuum housing having first and second ends;

b. a cap closing said first end of said vacuum housing;

c. a reciprocatable can seal body at said second end of said vacuum housing, said reciprocatable can seal body including a major diameter portion slidably engaging said inner surface of said peripheral wall of said vacuum housing and a minor diameter portion integral with said major diameter portion and having an end protruding outwardly from said second end of said vacuum housing;

d. a central passageway extending completely through said reciprocatable can seal body;

e. a valve stem mounting disk fixedly positioned within said vacuum housing beneath said cap at said first end of said vacuum housing;

f. a valve stem attached to said valve stem mounting disk and extending therefrom toward said reciprocatable can seal body, said valve stem having a free end with a seal affixed thereto, said seal being aligned with said central passageway of said reciprocatable can seal body;

g. a spring aligned over said valve stem and having ends bearing against said valve stem mounting disk and said reciprocatable can seal body;

h. a vacuum line passing through said peripheral wall of said vacuum housing and communicating with said hollow interior of said vacuum housing; and i. an electrolyte fill line communicating with said central passageway of said reciprocatable can seal body.

2. The filling fixture in accordance with claim 1, wherein said vacuum housing has an internal shoulder against which said major diameter portion of said reciprocatable can seal body abuts in one position thereof.

3. The filling fixture in accordance with claim 1, wherein a sealing O-ring is captivated in a groove in said interior wall of said vacuum housing and bears against said minor diameter portion of said reciprocatable can seal body.

4. The filling fixture in accordance with claim 1, wherein a sealing O-ring is mounted on said end of said reciprocatable can seal body which protrudes outwardly from said second end of said vacuum housing for engagement with said cell casing.

5. The filling fixture in accordance with claim 1, wherein said central passageway of said reciprocatable can seal body includes a large diameter portion at said protruding end of said reciprocatable can seal body and a small diameter portion facing said seal affixed to the free end of said valve stem, and wherein said electrolyte fill line communicates with said large diameter portion of said central passageway.

6. The filling fixture in accordance with claim 1, wherein said cap at said first end of said vacuum housing has a mounting fixture rod secured thereto.

7. A filling fixture for vacuum assisted filling of a battery cell, having a cell casing and an internal electrode assembly, with an electrolyte, comprising:

a. a vacuum housing having a hollow interior;

b. a valve stem located within said hollow interior of said vacuum housing, said valve stem including a seal;

c. a movable can seal body having a passageway extending therethrough and aligned with said seal, said movable can seal body having a portion lying within said vacuum housing and a portion extending outwardly from said vacuum housing;

d. a vacuum line communicating with said hollow interior of said vacuum housing; and e. an electrolyte fill line communicating with said passageway of said movable can seal body.

8. The filling fixture in accordance with claim 7 and further including a spring arranged around said valve stem for urging said movable can seal body in a direction away from said seal.

* * * * *